(12) United States Patent
Murata (10) Patent No.: US 7,307,708 B2
(45) Date of Patent: Dec. 11, 2007

(54) ECCENTRICITY MEASURING METHOD AND ECCENTRICITY MEASURING APPARATUS

(75) Inventor: Yasunori Murata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 10/983,605

(22) Filed: Nov. 9, 2004

(65) Prior Publication Data

US 2005/0128468 A1    Jun. 16, 2005

(30) Foreign Application Priority Data

Nov. 28, 2003    (JP)    ............... 2003-399880

(51) Int. Cl.
*G01B 9/00*    (2006.01)
(52) U.S. Cl. ...................... 356/127; 356/124
(58) Field of Classification Search ............... 356/124, 356/127, 140, 142, 139.02, 139.04, 125
See application file for complete search history.

(56) References Cited

U.S. PATENT DOCUMENTS

| | | | |
|---|---|---|---|
| 4,149,801 A * | 4/1979 | Volk | 356/124 |
| 4,213,701 A * | 7/1980 | Lanzilloti | 356/124 |
| 5,059,022 A * | 10/1991 | Ookawa | 356/124 |
| 5,351,119 A * | 9/1994 | Nakatsue | 356/124 |
| 5,539,837 A * | 7/1996 | Lindmark | 382/100 |
| 5,844,670 A * | 12/1998 | Morita et al. | 356/124 |

FOREIGN PATENT DOCUMENTS

| | | |
|---|---|---|
| JP | 51-9620 | 3/1976 |
| JP | 4-190130 | 7/1992 |
| JP | 7-39982 | 5/1995 |
| JP | 7-81931 | 9/1995 |
| JP | 2621119 | 4/1997 |
| JP | 3054287 | 4/2000 |

OTHER PUBLICATIONS

Yoshiya Matsui, et al., "Eccentricity Measurement of Optical System", *Optical Technology Contact*, vol. 13, No. 11, pp. 11-20.
Yoshiya Matsui, "Lens Design Method", Kyoritsu Shuppan Co., Ltd., pp. 14-38.
Aug. 10, 2007 Official Action in Chinese Patent Application No. 200410095067.4 (with translation).

* cited by examiner

*Primary Examiner*—Gregory J. Toatley, Jr.
*Assistant Examiner*—Scott M Richey
(74) *Attorney, Agent, or Firm*—Fitzpatrick, Cella, Harper & Scinto (57) ABSTRACT

A surface to be tested and an optical system for projecting an index to an apparent spherical center position of the surface to be tested are moved relative to each other and an eccentric quantity of the surface to be tested is calculated from an movement quantity. A focal distance of an optical system is changed according to an apparent radius of curvature of each surface to be tested, which is calculated in advance. A reflection image on a surface to be tested, which is to be measured, is determined from the apparent radius of curvature of each surface to be tested, which is calculated in advance. Thus, an eccentric quantity of the entire lens system is accurately measured.

5 Claims, 6 Drawing Sheets

ECCENTRICITY MEASURING METHOD AND ECCENTRICITY MEASURING APPARATUS

BACKGROUND OF THE INVENTION

1. Field of the Invention

The present invention relates to an eccentricity measuring method and is suitable to measure eccentricity of a lens system such as a zoom lens, which is composed of a plurality of lens elements and has a movable portion.

2. Related Background Art

Conventional eccentricity measuring methods are described in detail in "Eccentricity Measurement of Optical System", Yoshiya Matsui and Masayuki Usui, Optical Technology Contact, Vol. 13, No. 11, pp. 11-20. The following three methods, (1) a test lens rotation method,
(2) a test lens still East Germany Zeiss method, and
(3) a test lens still image rotator method are introduced.

According to any of those eccentricity measuring methods, an index is projected to the apparent center of curvature of a surface to be tested by an auto-collimation method. An eccentric quantity is calculated from states (deflection and displacement) of a reflection image on the surface to be tested relative to a measurement reference axis.

The method (1) has an advantage that high precision measurement can be performed with a simple structure. However, when a test lens includes a movable portion as in a zoom lens, accurate eccentric measurement is impossible. This reason is as follows. In a lens system including a movable portion, it is necessary to provide a minute gap at a sliding portion which is moved. When the eccentricity of the test lens is measured during the rotation thereof as in this method, an eccentric state is changed by a change in posture due to the weight of the lens itself.

In the measurement using the method (2), the test lens is not rotated. Therefore, it is possible to measure the eccentricity of the lens system which includes the movable portion. However, measurement light transmits through a half mirror six times, so that a light quantity loss becomes a large problem. An application of this method is proposed in JP 03-054287 B.

According to the method (3), the use of an image rotator makes it possible to measure the eccentricity of the test lens without the rotation thereof. In addition to this, since the number of times in use of a half mirror is small, a light quantity loss is low. Applications of this method are proposed in JP 51-009620 B, JP 07-081931 B, JP 07-039982 B, and JP 2621119 B.

A method of performing eccentric measurement by relatively moving an auto-collimation optical system and the test lens is also proposed in JP 04-190130 A.

When the eccentricity of the lens system composed of the plurality of lens elements is measured by the conventional methods, it is particularly important to accurately measure the state of the reflection images on all surfaces composing the lens system. If a reflection image on any of the surfaces cannot be measured, a result of eccentric quantities measured on surfaces located in the back of such a surface becomes inaccurate.

However, when it is intended to actually perform the eccentric measurement by the above-mentioned conventional methods, the state of the reflection image cannot be measured in many cases. More specifically, the following problems occur.

An unmeasurable surface on which the reflection image cannot be measured is caused in some cases.

An eccentric measurement value on a test surface having a large eccentric error includes a large measurement error.

As is apparent from experiments, the test surface having the large eccentric error is likely to become an unmeasurable surface. In order to prevent a measurement error on the test surface having the large eccentric error from increasing, the following method is proposed in JP 07-081931 B. According to the method, the eccentricity of the lens system is temporarily measured. An optimal optical axis is calculated so as to reduce the root-mean-square value of the measured eccentricity. A mounting position of the test lens is adjusted based on a result obtained by the calculation. The eccentricity of the lens system is measured again. However, up to now, the analysis of fundamental causes of the above-mentioned problems and specific measures against the causes are not taken.

SUMMARY OF THE INVENTION

An object of the present invention is to provide an eccentricity measuring apparatus and an eccentricity measuring method which are capable of accurately measuring an eccentric quantity, even in eccentric measurement of a lens system composed of a plurality of lens elements, by analyzing a cause of an unmeasurable surface and a cause of low measurement precision in eccentric measurement performed by a conventional method.

According to the present invention, as one example, a surface to be tested and an optical system for projecting an index to an apparent spherical center position of the surface to be tested are moved relative to each other and an eccentric quantity of the surface to be tested is calculated from an movement quantity. A focal distance of the optical system is changed according to an apparent radius of curvature of each surface to be tested, which is calculated in advance. A reflection image on a surface to be tested, which is to be measured is determined from the apparent radius of curvature of each surface to be tested, which is calculated in advance.

In addition, an index which includes crossed lines, a mark having a symmetric shape with respect to one of the crossed lines, and a mark having a symmetric shape with respect to the other of the crossed lines is disclosed as an index (chart) preferably used for the eccentric measurement of the lens system composed of the plurality of lens elements.

DESCRIPTION OF THE PREFERRED EMBODIMENTS

Hereinafter, embodiments of the present invention will be described with reference to the accompanying drawings. First, a cause of an unmeasurable surface and a cause of low measurement precision in eccentric measurement performed by a conventional method will be described.

With respect to a situation that the unmeasurable surface is caused in the eccentric measurement performed by the conventional method, there are
the case where a reflection image is not viewed; and
the case where a reflection image serving as an image to be measured cannot be determined because a plurality of reflection images are observed.

A cause in which the reflection image is not viewed or is hard to view is because reflection light related to a chart image projected to the center of curvature of a surface to be tested is not returned to an eyepiece system or the amount of return light is small. Fundamentals in the case where the reflection light is not returned to the eyepiece system and in the case where the amount of return light is small will be described.

A condition that a chart image projected to a test lens by an auto-collimation method is formed as a reflection image on the field of view of the eyepiece system includes:
the case where the chart image is projected to an apparent spherical center position (center position of curvature) of the surface to be tested; and
the case where the chart image is projected to an apparent apex position (surface position) of the surface to be tested.

The chart image projected to the apparent spherical center position (center position of curvature) of the surface to be tested is reflected on the surface to be tested. An image having an imaging magnification of −1 is formed as a reflection image on an imaging surface of the eyepiece system. Hereinafter, this reflection image is referred to as "a spherical center reflection image". The chart image projected to the apparent apex position (surface position) of the surface to be tested is reflected on the surface to be tested. An image having an imaging magnification of +1 is formed as a reflection image on the imaging surface of the eyepiece system. Hereinafter, this reflection image is referred to as "an apex reflection image".

The spherical center reflection image is deflected (displaced) on the imaging surface of the eyepiece system in substantially proportion to an eccentric quantity of the surface to be tested. On the other hand, the apex reflection image is not deflected on the imaging surface of the eyepiece system even when the surface to be tested is made eccentric. Therefore, the apex reflection image is formed at a constant position.

When a test lens has no eccentricity and thus the optical axis of the test lens is aligned with a measurement optical axis, a spherical center reflection image on each surface of the test lens is surely formed on the imaging surface of the eyepiece system. However, when eccentric measurement is actually performed on a test lens having eccentricity, the case where the spherical center reflection image is not returned to the imaging surface of the eyepiece system and thus cannot be observed occurs.

Studies of the inventor(s) of the present invention resulted in the occurrence of a phenomenon that the spherical center reflection image could not be viewed when an absolute value of "the apparent radius of curvature" of a surface to be tested is small (curvature is large).

Here, a definition of "the apparent radius of curvature" will be described.

"The apparent radius of curvature" is an apparent radius of curvature of the surface to be tested in the case where the surface to be tested is viewed from a first surface side of the lens system. This apparent radius of curvature is defined as a distance between the apparent apex position (surface position) of the surface to be tested and the apparent spherical center position (center position of curvature) thereof. The apparent apex position and the apparent spherical center position can be calculated by optical paraxial calculation and obtained based on design data of a test lens system.

An apparent radius of curvature of a V-th surface is changed by an optical system including a first surface to a (V−1)-th surface, so that the apparent radius of curvature is different from an actual radius of curvature. In some cases, the apparent radius of curvature becomes extremely smaller or larger than the actual radius of curvature. There is also the case where a sign of the radius of curvature is reversed.

Assume that an optical axis direction is set as an X-axis, H indicates an quantity in a direction perpendicular to the X-axis, $R_0$ indicates a paraxial radius of curvature, K indicates a circular cone constant, and A, A', B, B', C, C', ... indicate aspherical coefficients. When a lens system includes an aspherical surface, an aspherical shape rotationally symmetric with respect to the X-axis is defined by $$x = \frac{\left(\frac{1}{R_0}\right)H^2}{1+\sqrt{1-(1+K)\left(\frac{H}{R_0}\right)^2}} + \frac{AH^2 + A'H^3 + BH^4 + B'H^5 +}{CH^6 + CH^7 + DH^8 + D'H^9 + EH^{10}}$$

In this case, when paraxial calculation is performed using R calculated by $$R = \frac{1}{2A + \frac{1}{R_0}}$$

it can be assumed that the aspherical surface is similar to a spherical surface in a paraxial region (see "Lens Design Method": Yoshiya Matsui, Kyoritsu Shuppan Co., Ltd.).

Figure 6A:
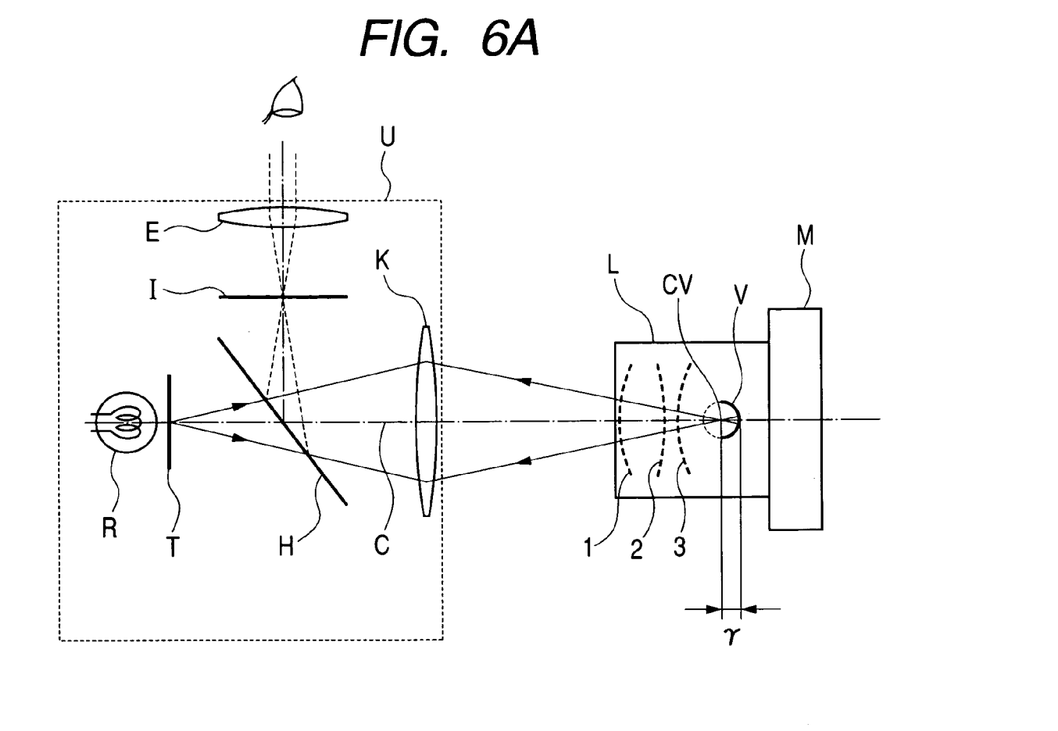
FIGS. 6A and 6B are explanatory views showing a spherical center reflection image in the case where an apparent radius of curvature is small.
Figure 6B:
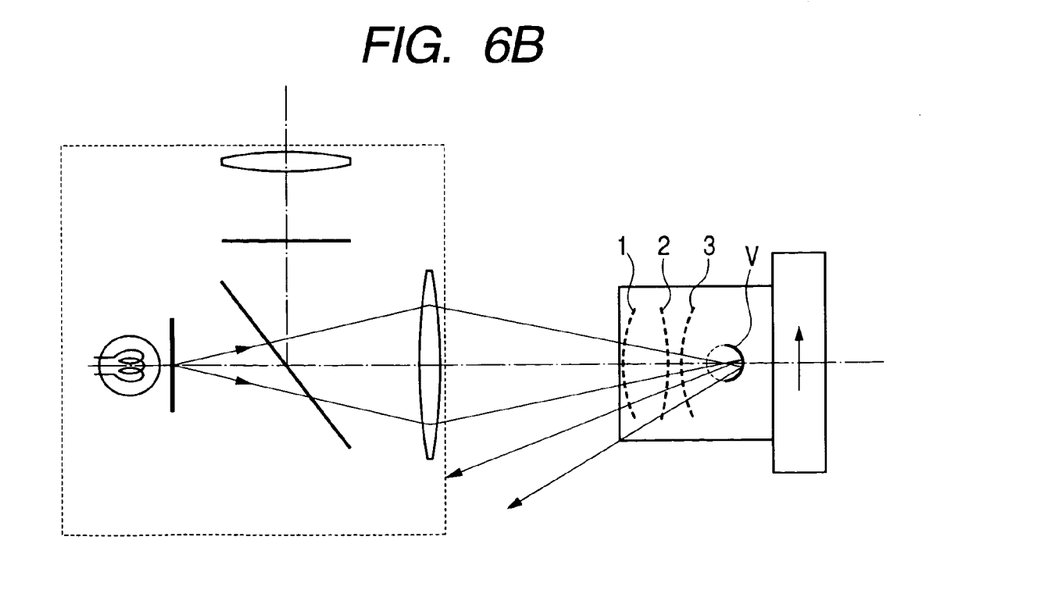

FIGS. 6A and 6B each show the case where the apparent radius of curvature of the V-th surface is extremely small. As shown in FIG. 6A, an index chart T illuminated by an illumination light source R is projected to a test lens L by a collimator objective lens K through a half mirror H. The collimator objective lens K forms an image of the index chart T at the apparent spherical center position of the surface to be tested (here, the V-th surface). The test lens L is composed of a plurality of lens surfaces including the first surface to the V-th surface and is held to a lens holding mount M. A reflection image on the test lens L is formed on an imaging surface chart I through the collimator objective lens K. The reflection image formed on the imaging surface chart I is observed through an eyepiece E. An auto-collimation optical system U is composed of the illumination light source R, the index chart T, the half mirror H, the collimator objective lens K, the imaging surface chart I, and the eyepiece E.

As shown in FIG. 6A, when the test lens L has no eccentricity and thus the optical axis of the test lens L is aligned with a measurement reference axis C, a spherical center reflection image on the V-th surface is formed on the imaging surface chart I of the eyepiece system. However, when the test lens L has eccentricity and thus the apparent spherical center position of the V-th surface is deviated from the measurement reference axis C, as shown in FIG. 6B, a spherical center reflection light beam on the V-th surface in which an apparent radius of curvature r is small is not returned to the eyepiece system.

Even when the test lens L has no eccentricity and thus the optical axis of the test lens L is aligned with the measurement reference axis C, only an image of the central region of the index chart T projected by the auto-collimation optical system U is returned to an observation system (eyepiece system) and an image of the peripheral region of the index chart T is not returned to the observation system. This is because an image circle (imaging area) of the index chart T which can be observed through the observation system becomes smaller. Therefore, even when the eccentricity is a small quantity, the spherical center reflection image disappears in some cases.

This is a problem in that the unmeasurable surface is caused in the conventional measurement method.

In order to return the spherical center reflection light beam on the V-th surface to the observation system, the apparent spherical center position of the V-th surface may be aligned with the measurement reference axis C of the auto-collimation optical system U. That is, when the auto-collimation optical system U and the test lens L are relatively moved in a direction perpendicular to the measurement reference axis C, it is possible to return the spherical center reflection light beam on the V-th surface to the imaging surface of the observation system. In an eccentricity measuring apparatus according to an embodiment described later, in order to position a spherical center reflection image on each surface to be tested at the origin position of the imaging surface chart I of the observation system, the auto-collimation optical system U and the test lens L are allowed to relatively move in the direction perpendicular to the measurement reference axis C. In such an eccentricity measuring apparatus, for example, an actual eccentric quantity of the test lens L is calculated from a movement quantity of the auto-collimation optical system U and a movement quantity of the test lens L. Therefore, it can be eliminated that the impossibility of measurement occurs because the apparent radius of curvature r is small.

The spherical center reflection image on the surface in which the apparent radius of curvature r is small includes large distortion, so that a relationship between a deflection quantity (displacement quantity) of the spherical center reflection image and the eccentric quantity of the surface to be tested is out of a proportional relationship. Thus, even when the deflection quantity of the spherical center reflection image can be observed through the observation system, there is the case where a measurement error becomes larger in the conventional method because of the influence of distortion.

A problem with respect to such a measurement error can be also solved by relatively moving the auto-collimation optical system U and the test lens L in the direction perpendicular to the measurement reference axis so as to position the spherical center reflection image on the surface to be tested at the origin position of the imaging surface chart I. In other words, according to such a method, a reflection image at a position in which image height is zero is measured. Therefore, the influence of distortion due to the reflection on the surface in which the apparent radius of curvature r is small can be avoided and it is possible to reduce the measurement error.

Figure 7:
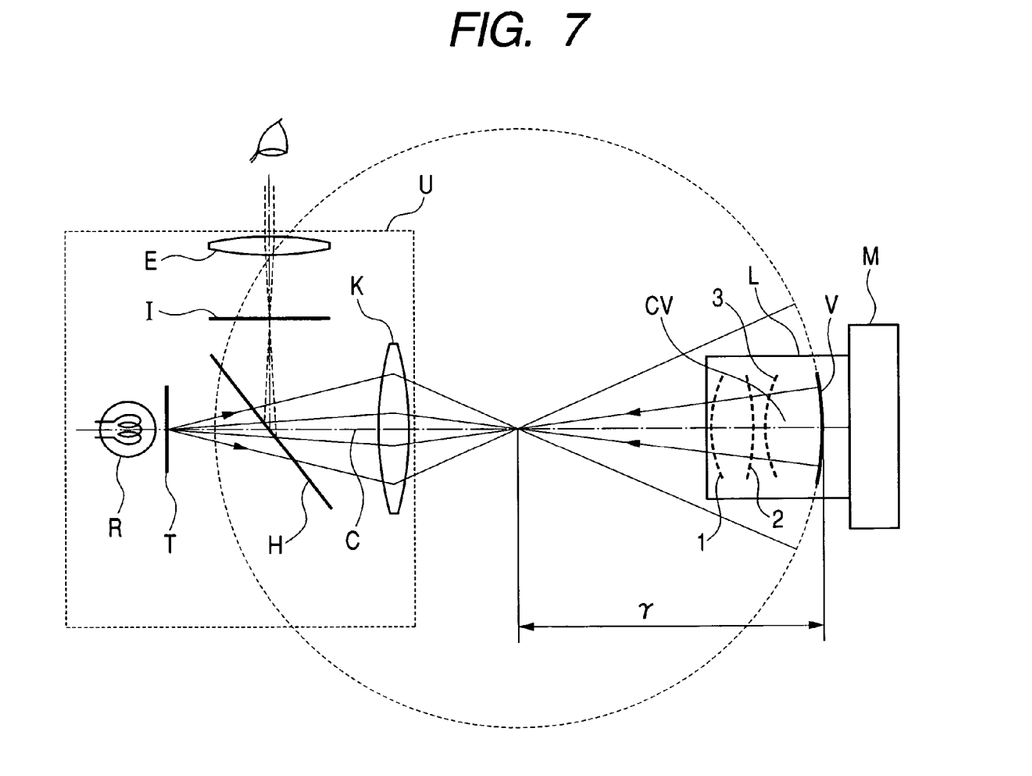
FIG. 7 is an explanatory view showing a spherical center reflection image in the case where the apparent radius of curvature is large.

FIG. 7 shows the case where the apparent radius of curvature r is large.

In the case where the apparent radius of curvature r is large, when a light beam related to the index chart T projected by the auto-collimation optical system U is incident on the V-th surface, only a light beam on and near the optical axis, of the spherical center reflection light beam on the V-th surface is reflected. Therefore, a light beam returned to the observation system becomes a state in which an aperture is narrowed, with the result that the amount of light reduces to darken the reflection image. When the aperture is narrowed, a reflection image which has low resolution and blurs is formed on the imaging surface chart I because of the influence of diffraction.

In order to solve such a problem, the focal distance of the collimator objective lens K may be made variable. More specifically, the collimator objective lens K may be composed of an optical system whose focal distance is variable as in a zoom lens. Alternatively, the collimator objective lens K may be constructed to be exchangeable for one of a plurality of optical systems having different focal distances. In an eccentricity measuring apparatus according to an embodiment described later, when the apparent radius of curvature of the surface to be tested is large, the focal distance of the collimator objective lens K can be lengthened. Therefore, a projection magnification of the chart image is increased to widen an aperture for the light beam related to the reflection image.

First Embodiment

Figure 1:
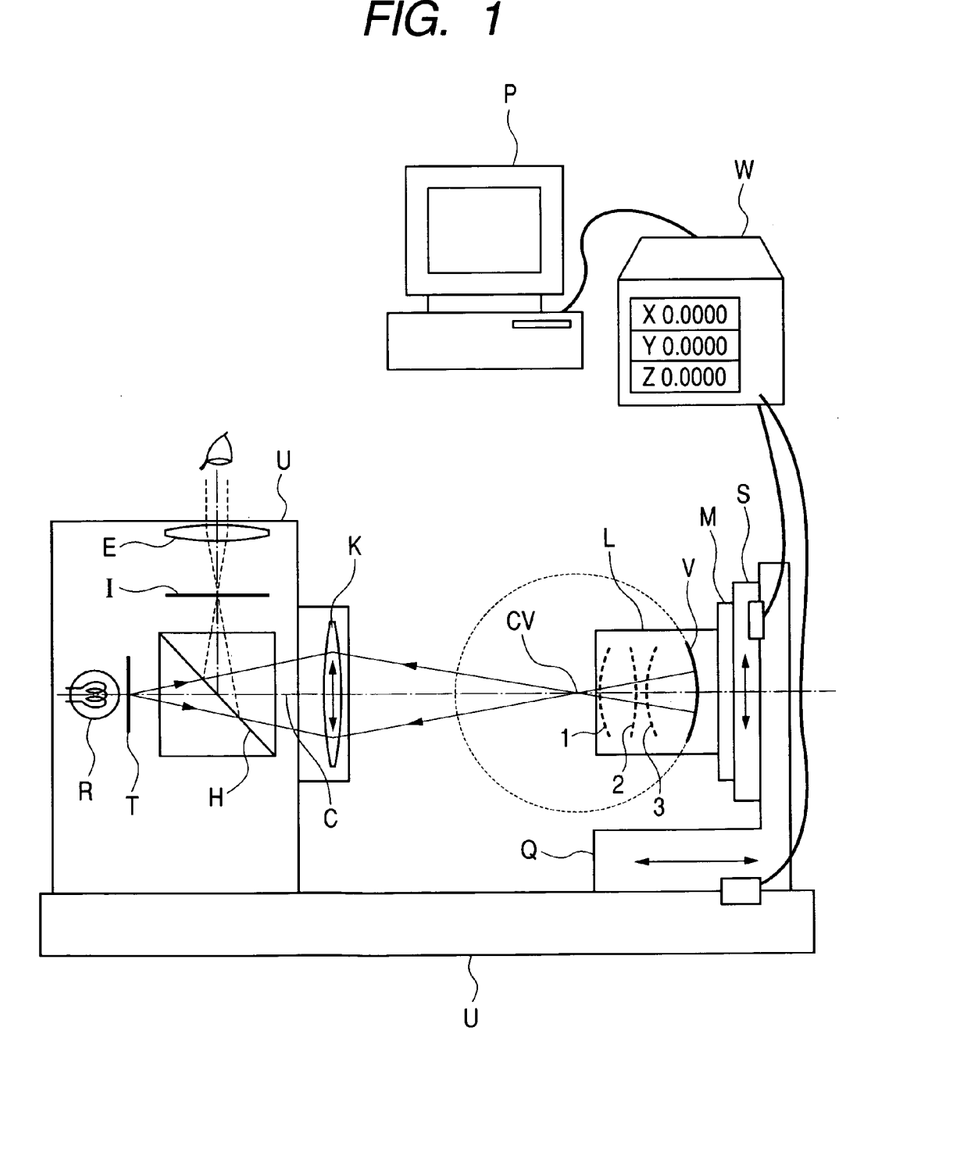
FIG. 1 is a schematic view showing an eccentricity measuring apparatus according to a first embodiment of the present invention.

FIG. 1 is a schematic view showing an eccentricity measuring apparatus according to a first embodiment.

In FIG. 1, the index chart T illuminated by the illumination light source R is projected to the test lens L by the collimator objective lens K through the half mirror (beam splitter) H. The collimator objective lens K is constructed to be exchangeable. The focal distance of the collimator objective lens K can be varied according to the apparent radius of curvature of the surface to be tested. When the collimator objective lens K is exchanged for another collimator objective lens, a projection image of the index chart T is displaced in some cases before and after the exchange. Thus, the collimator objective lens K has a structure capable of being adjusted in the direction perpendicular to the measurement reference axis (measurement axis) C so as to align the origin of the image of the index chart T with the measurement reference axis C.

Figure 2:
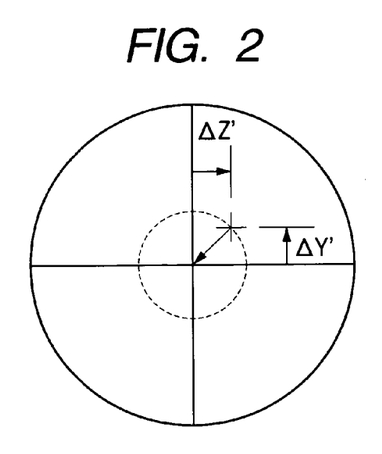
FIG. 2 is an explanatory view showing a field of view of an observation system according to the first embodiment of the present invention.

The test lens L is composed of the plurality of lens surfaces including the first surface to the V-th surface and is held to the lens holding mount M. The reflection image on the test lens L is formed on the imaging surface chart I through the collimator objective lens K. The deflection quantity (displacement quantity) of the reflection image relative to the imaging surface chart I is observed through the eyepiece E. The index chart T and the imaging surface chart I are set at an equal distance from the half mirror H. The spherical center reflection image of the index chart T is formed as a reversed equal size image at the position of the imaging surface chart I. FIG. 2 shows a field of view for observation. In FIG. 2, the center of the reflection image of the index chart T is simply indicated by "+". FIG. 2 shows a state in which there are displacement quantities of ΔY' and ΔZ' relative to the imaging surface chart I. The index chart T and the imaging surface chart I which are actually used in this embodiment will be described later in detail.

The auto-collimation optical system U is composed of the illumination light source R, the index chart T, the half mirror H, the collimator objective lens K, the imaging surface chart I, and the eyepiece E. When the eccentric measurement is performed, the relative distance between the auto-collimation optical system U and the test lens L is changed along the measurement reference axis C, and the image of the index chart is projected to an apparent spherical center position CV of each of surfaces to be tested of the test lens. The measurement of the eccentric quantity is performed in order from the first surface.

The lens holding mount M has a tilt adjustable structure capable of adjusting a mount surface such that the mount surface becomes perpendicular to the measurement reference axis C. The lens holding mount M is fixed to a movable stage S which is movable in the direction perpendicular to the measurement reference axis C. The movable stage S is provided to a movable stage Q which is movable in the measurement reference axis C direction. Therefore, the lens holding mount M is set so as to be movable in two-axis directions including the up-and-down direction and the frontward-and-backward direction relative the paper shown in FIG. 1. The movable stage Q is set so as to be movable in the right-and-left direction relative to the paper on a rail N extended to the measurement reference axis C direction. With respect to the coordinate system in the moving direction of each of the movable stages, the right-and-left direction relative to the paper is set as the X-axis. The apex of the first surface of the test lens is set as an origin point. The left direction is set as a minus direction and the right direction is set as a plus direction. The up-and-down direction relative to the paper is set as the Y-axis. The frontward-and-backward direction relative the paper is set as the Z-axis.

Up to now, it is hard to project an index to the apparent center position of curvature of each surface to be tested on the measurement reference optical axis C with high precision by mechanical stage movement. Therefore, in order to eliminate an error due to the mechanical stage movement, a lens rotation method and an image rotator method have been devised. However, it is hard to reduce a displacement in rotational axis in the lens rotation method and the image rotator method to completely zero, so that the axis is slightly displaced.

Studies of the inventor(s) of the present invention resulted in the following. In the case where the rail N extended to the measurement reference axis C direction is made from a high precision metallic rail and laid on a fast surface plate whose surface is processed with high precision, when the movable stages S and Q are moved on the rail N at a stage movement quantity of 1 m or less, it is possible to reduce a tilt error of each of the movable stages to about 20 seconds or less, preferably about 10 seconds or less. In order to realize higher precision, a stage with an air bearing is employed. A ceramic or a stone column formed by processing natural plutonic rock with high precision is used as a shaft. Thus, when the stage movement quantity is 1 m or less, it is possible to reduce the tilt error to 5 seconds or less.

When the tilt error is reduced as described above (to about 20 seconds or less, preferably about 10 seconds or less, more preferably 5 seconds or less), eccentric measurement precision necessary to measure the eccentricity of a general photographing lens, a video camera lens, a digital still camera lens, or the like is sufficient in practice. The apparatus according to this embodiment has a simple structure which does not include a rotation portion and a reflection prism. As a result, the number of error factors is small, so that the precision can be improved as compared with the case of a conventional apparatus.

Next, an order of measuring the eccentric quantity will be described.

(1) The collimator objective lens K which is exchangeable is mounted into the auto-collimation optical system U. The collimator objective lens K is adjusted so as to align the reference origin of the projection image of the index chart T with the measurement reference axis C, and then fixed.

(2) The tilt of the lens holding mount M is adjusted such that the mount surface becomes perpendicular to the measurement reference axis C.

(3) The movable stage S is adjusted so as to align the center of the mount surface of the lens holding mount M with the measurement reference axis C. Then, values in the Y-axis and Z-axis directions which are obtained by a movement quantity detecting apparatus W at a position for alignment are set as the reference origin.

(4) The test lens L is held to the lens holding mount M. The movable stage Q is moved in the measurement axis direction so as to form the image of the index chart at the apex of the first surface of the test lens L. Then, a value in the X-axis direction which is obtained by the movement quantity detecting apparatus W at a position for imaging is set as the reference origin.

(5) The apex of the first surface of the test lens L is set as the origin. The apparent spherical center position, the apparent apex position, and the apparent radius of curvature of each of surfaces including the first surface to the final surface are calculated by an eccentricity calculating apparatus P based on design data with a design reference state (state having no eccentricity) of the test lens L.

(6) In order to project the projection image of the index chart T to the calculated spherical center position of each of the surfaces to be tested, the movable stage Q is moved while the movement quantity in the X-axis direction which is displayed on the movement quantity detecting apparatus W is checked.

(7) The spherical center reflection image formed on an observation system imaging surface chart (imaging surface chart I) is observed through the eyepiece E.

(8) When the surface to be test has eccentricity, the spherical center reflection image is deviated from the origin of the observation system imaging surface chart. In this case, the movable stage S is moved such that the spherical center reflection image coincides with the origin of the observation system imaging surface chart. At this time, movement quantities ΔY and ΔZ of the movable stage S in the Y-axis and Z-axis directions are detected by the movement quantity detecting apparatus W. The detected movement quantities are sent to the eccentricity calculating apparatus P and an actual eccentric quantity is calculated thereby.

When the test lens L has no eccentricity and thus the optical axis of the test lens L is aligned with the measurement reference axis C, the light beam related to the image of the index chart T projected to the apparent spherical center position is reflected on the surface to be tested. The reflected light beam is returned to the optical path through which the light beam transmitted. The returned light beam is split into two by the half mirror H. One light beam is imaged onto the surface of the index chart and the other light beam is imaged onto the imaging surface chart of the eyepiece system which is provided at an equal distance relative to the index chart. When the test lens L has no eccentricity and thus the optical axis of the test lens L is aligned with the measurement reference axis C, the spherical center reflection image coincides with the origin as the center of the observation system imaging surface chart.

When the test lens L has eccentricity, the spherical center reflection image is deviated from the origin of the observation system imaging surface chart. In a conventional eccentricity measuring method, the displacement quantities of $\Delta Y'$ and $\Delta Z'$ are detected and the eccentric quantity is calculated from the detected displacement quantities. In this embodiment, the movement quantities of the movable stage S are detected by the movement quantity detecting apparatus W and the actual eccentric quantity is calculated by the eccentricity calculating apparatus P. The movement quantity detecting apparatus W detects the movement quantities by reading movement quantity information from a sensor such as Magnescale produced by Sony Precision Technology Inc., which is provided in each of the movable stage portions in the X-, Y-, and Z-axes. In this embodiment, the movement quantities $\Delta Y$ and $\Delta Z$ of the movable stage S relative to the measurement reference axis C become apparent parallel eccentric quantities on the surface to be tested.

In order to obtain the apparent parallel eccentric quantities $\Delta Y$ and $\Delta Z$ of the surface to be tested by a conventional method, the displacement quantities of $\Delta Y'$ and $\Delta Z'$ of the spherical center reflection image on a field of view for observation are detected and multiplied by the projection magnification of the collimator objective lens. Because the reflection image becomes a magnification of two times, the displacement quantities are multiplied by ½ to calculate the apparent parallel eccentric quantities. Therefore, when the collimator objective lens is exchanged for another collimator objective lens or composed of a lens whose focal distance is variable, it is necessary to change the projection magnification of the collimator objective lens to a predetermined magnification and to calculate the apparent parallel eccentric quantities for every exchange or every time the focal distance varies. In contrast to this, in the method according to this embodiment, the movement quantities $\Delta Y$ and $\Delta Z$ of the movable stage S become the apparent parallel eccentric quantities on the surface to be tested regardless of the projection magnification of the collimator objective lens. Thus, there is an advantage in that a calculation algorithm is simpler than that in the conventional method. A feature point of the method according to this embodiment is that the number of unmeasurable surfaces is significantly reduced by measuring the apparent eccentric quantities on the surface to be tested while the movable stage is moved in the direction perpendicular to the measurement reference axis.

The reason why an unmeasurable surface is caused in a conventional method and the measures against the occurrence of the unmeasurable surface in the present invention will be described with reference to an example of numerical data of a video camera zoom lens.

Tables 1, 2, and 3 described below show lens data of a video camera zoom lens having a focal distance f of 5.849 to 56.263. Table 1 shows numerical data at a wide angle end. Table 2 shows numerical data at a telephoto end. Table 3 shows a paraxial radius of curvature, a circular cone constant, and aspherical coefficients of a twelfth surface which is an aspherical surface.

Figure 3:
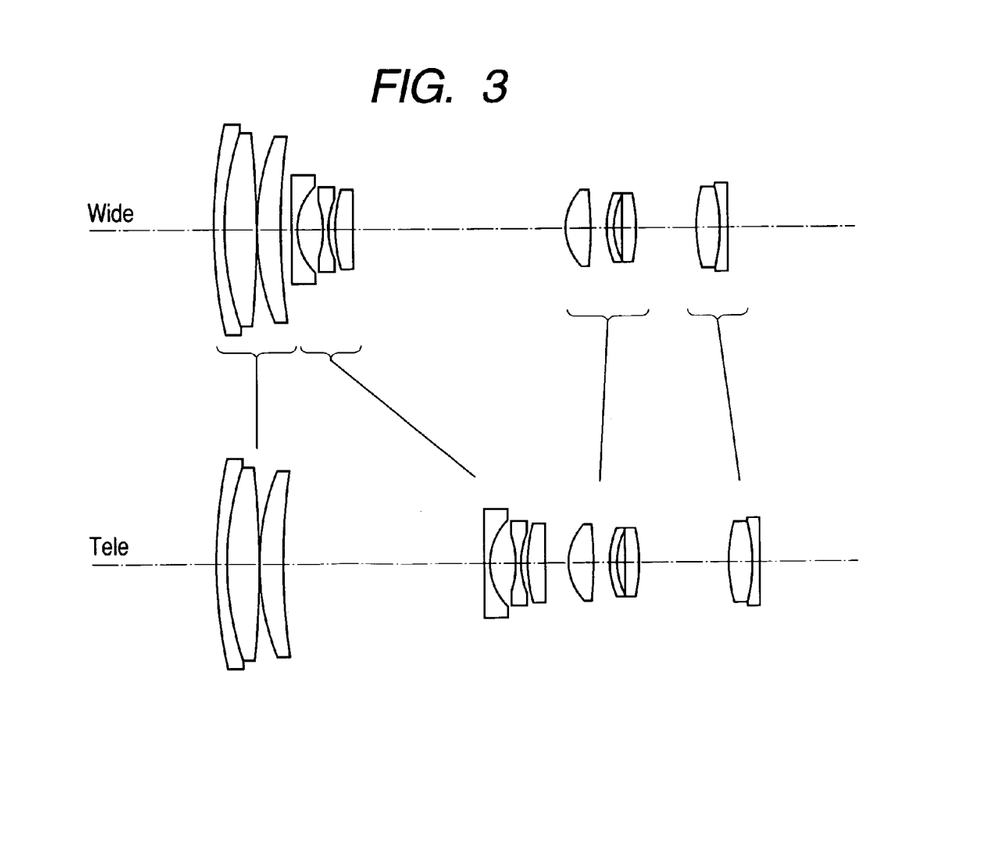
FIG. 3 is a sectional view showing a zoom lens according to a first embodiment of the present invention.

The zoom lens has a nine-group eleven-lens structure including a first lens surface to a twentieth lens surface. FIG. 3 is a lens sectional view showing the zoom lens. The zoom lens is divided into four blocks. A first block includes G1/2 and G3 (first surface to fifth surface). A second block includes G4, G5, and G6 (sixth surface to eleventh surface). A third block includes G7, G8, and G9 (twelfth surface to seventeenth surface). A fourth block includes G10/11 (eighteenth surface to twentieth surface). A focal distance is varied for zooming by changing an interval between the respective blocks.

Tables 1 and 2 show data which are related to a surface number, an actual radius of curvature, an actual surface interval, and a refractive index. On the right of those data, Tables 1 and 2 further show data which are related to an apparent spherical center position, an apparent apex position, and an apparent radius of curvature, which are calculated by paraxial calculation and located.

The apparent spherical center position is calculated from design data using the apex of the first surface as the origin with respect to a position where the actual spherical center position of each of the surfaces is observed at the time when the zoom lens is viewed from the first surface side. The apparent apex position is calculated from design data using the apex of the first surface as the origin with respect to a position where the actual apex position of each of the surfaces is observed at the time when the zoom lens is viewed from the first surface side. The apparent radius of curvature is an apparent radius of curvature of each of the surfaces at the time when the zoom lens is viewed from the first surface side. The apparent radius of curvature is defined for calculation as a distance between the apparent apex position and the apparent spherical center position.

Tables 1 and 2 show data at the wide angle end and data at the telephoto end, which are listed in an order of surface number together with data arranged in ascending order of apparent spherical center position.

TABLE 1

| Surface Number | Actual Radius of Curvature R | Actual Surface Interval | Refractive Index N | Apparent Spherical Center Position | Apparent Apex Position | Apparent Radius of Curvature |
|---|---|---|---|---|---|---|
| Wide Angle End Focal Distance f = 5.849 | | | | | | |
| 1 | 54.593 | 1.200 | 1.84666 | 54.593 | 0.000 | 54.593 |
| 2 | 27.444 | 3.900 | 1.48749 | 20.425 | 0.656 | 19.768 |
| 3 | −173.066 | 0.200 | 1.00000 | −89.077 | 3.350 | −92.428 |
| 4 | 24.110 | 2.750 | 1.77250 | 32.307 | 3.557 | 28.750 |
| 5 | 72.903 | 0.800 | 1.00000 | −70.328 | 5.265 | −75.592 |
| 6 | 46.331 | 0.700 | 1.83400 | −141.580 | 6.222 | −147.802 |
| 7 | 6.636 | 2.966 | 1.00000 | 12.283 | 6.698 | 5.585 |
| 8 | −20.914 | 0.600 | 1.77250 | 66.691 | 9.768 | 56.922 |
| 9 | 20.914 | 0.750 | 1.00000 | 14.400 | 10.044 | 4.356 |
| 10 | 15.225 | 1.800 | 1.92286 | 14.071 | 10.582 | 3.489 |
| 11 | 219.179 | 25.714 | 1.00000 | 19.998 | 11.159 | 8.839 |
| *12 | 9.207 | 2.600 | 1.58313 | 17.637 | 16.976 | 0.662 |
| 13 | 377.119 | 2.160 | 1.00000 | 14.496 | 17.129 | −2.633 |
| 14 | 15.102 | 0.600 | 1.84666 | 22.949 | 17.367 | 5.583 |
| 15 | 8.428 | 0.820 | 1.00000 | 18.527 | 17.407 | 1.120 |
| 16 | 70.013 | 1.400 | 1.48749 | 29.704 | 17.513 | 12.191 |
| 17 | −28.241 | 7.000 | 1.00000 | 15.552 | 17.636 | −2.085 |
| 18 | 17.497 | 2.600 | 1.69680 | 27.935 | 18.787 | 9.148 |
| 19 | −17.497 | 0.600 | 1.84666 | 17.703 | 19.140 | −1.438 |
| 20 | −71.396 | −42.992 | 1.00000 | 16.580 | 19.227 | −2.647 |
| Wide Angle End Data Arranged in Ascending Order of Apparent Spherical Center Position | | | | | | |
| 6 | 46.331 | 0.700 | 1.83400 | −141.580 | 6.222 | −147.802 |
| 3 | −173.066 | 0.200 | 1.00000 | −89.077 | 3.350 | −92.428 |
| 5 | 72.903 | 0.800 | 1.00000 | −70.328 | 5.265 | −75.592 |
| 7 | 6.636 | 2.966 | 1.00000 | 12.283 | 6.698 | 5.585 |
| 10 | 15.225 | 1.800 | 1.92286 | 14.071 | 10.582 | 3.489 |

TABLE 1-continued

| Surface Number | Actual Radius of Curvature R | Actual Surface Interval | Refractive Index N | Apparent Spherical Center Position | Apparent Apex Position | Apparent Radius of Curvature |
|---|---|---|---|---|---|---|
| 9 | 20.914 | 0.750 | 1.00000 | 14.400 | 10.044 | 4.356 |
| 13 | 377.119 | 2.160 | 1.00000 | 14.496 | 17.129 | -2.633 |
| 17 | -28.241 | 7.000 | 1.00000 | 15.552 | 17.636 | -2.085 |
| 20 | -71.396 | -42.992 | 1.00000 | 16.580 | 19.227 | -2.647 |
| *12 | 9.207 | 2.600 | 1.58313 | 17.637 | 16.976 | 0.662 |
| 19 | -17.497 | 0.600 | 1.84666 | 17.703 | 19.140 | -1.438 |
| 15 | 8.428 | 0.820 | 1.00000 | 18.527 | 17.407 | 1.120 |
| 11 | 219.179 | 25.714 | 1.00000 | 19.998 | 11.159 | 8.839 |
| 2 | 27.444 | 3.900 | 1.48749 | 20.425 | 0.656 | 19.768 |
| 14 | 15.102 | 0.600 | 1.84666 | 22.949 | 17.367 | 5.583 |
| 18 | 17.497 | 2.600 | 1.69680 | 27.935 | 18.787 | 9.148 |
| 16 | 70.013 | 1.400 | 1.48749 | 29.704 | 17.513 | 12.191 |
| 4 | 24.110 | 2.750 | 1.77250 | 32.307 | 3.557 | 28.750 |
| 1 | 54.593 | 1.200 | 1.84666 | 54.593 | 0.000 | 54.593 |
| 8 | -20.914 | 0.600 | 1.77250 | 66.691 | 9.768 | 56.922 |

TABLE 2

| Surface Number | Actual Radius of Curvature R | Actual Surface Interval | Refractive Index N | Apparent Spherical Center Position | Apparent Apex Position | Apparent Radius of Curvature |
|---|---|---|---|---|---|---|
| Telephoto End Focal Distance f = 56.263 | | | | | | |
| 1 | 54.593 | 1.200 | 1.84666 | 54.593 | 0.000 | 54.593 |
| 2 | 27.444 | 3.900 | 1.48749 | 20.425 | 0.656 | 19.768 |
| 3 | -173.066 | 0.200 | 1.00000 | -89.077 | 3.350 | -92.428 |
| 4 | 24.110 | 2.750 | 1.77250 | 32.307 | 3.557 | 28.750 |
| 5 | 72.903 | 22.724 | 1.00000 | -70.328 | 5.265 | -75.592 |
| 6 | 46.331 | 0.700 | 1.83400 | -74.260 | 80.058 | -158.318 |
| 7 | 6.636 | 2.966 | 1.00000 | 154.811 | 88.148 | 66.662 |
| 8 | -20.914 | 0.600 | 1.77250 | -198.293 | 119.688 | -317.982 |
| 9 | 20.914 | 0.750 | 1.00000 | 194.566 | 123.057 | 71.509 |
| 10 | 15.225 | 1.800 | 1.92286 | 187.589 | 129.931 | 57.658 |
| 11 | 219.179 | 3.218 | 1.00000 | 403.293 | 137.807 | 265.486 |
| *12 | 9.207 | 2.600 | 1.58313 | 214.831 | 162.234 | 52.597 |
| 13 | 377.119 | 2.160 | 1.00000 | -38.925 | 174.509 | -213.434 |
| 14 | 15.102 | 0.600 | 1.84666 | 621.386 | 193.390 | 427.996 |
| 15 | 8.428 | 0.820 | 1.00000 | 284.849 | 196.603 | 88.246 |
| 16 | 70.013 | 1.400 | 1.48749 | 1100.984 | 205.005 | 895.979 |
| 17 | -28.241 | 10.507 | 1.00000 | 47.501 | 214.760 | -167.259 |
| 18 | 17.497 | 2.600 | 1.69680 | 1434.940 | 368.511 | 1066.429 |
| 19 | -17.497 | 0.600 | 1.84666 | 261.724 | 404.121 | -142.396 |
| 20 | -71.396 | -42.992 | 1.00000 | 154.808 | 412.922 | -258.113 |
| Telephoto End Data Arranged in Ascending Order of Apparent Spherical Center Position | | | | | | |
| 8 | -20.914 | 0.600 | 1.77250 | -198.293 | 119.688 | -317.982 |
| 3 | -173.066 | 0.200 | 1.00000 | -89.077 | 3.350 | -92.428 |
| 6 | 46.331 | 0.700 | 1.83400 | -74.260 | 84.058 | -158.318 |
| 5 | 72.903 | 22.724 | 1.00000 | -70.328 | 5.265 | -75.592 |
| 13 | 377.119 | 2.160 | 1.00000 | -38.925 | 174.509 | -213.434 |
| 2 | 27.444 | 3.900 | 1.48749 | 20.425 | 0.656 | 19.768 |
| 4 | 24.110 | 2.750 | 1.77250 | 32.307 | 3.557 | 28.750 |
| 17 | -28.241 | 10.507 | 1.00000 | 47.501 | 214.760 | -167.259 |
| 1 | 54.593 | 1.200 | 1.84666 | 54.593 | 0.000 | 54.593 |
| 20 | -71.396 | -42.992 | 1.00000 | 154.808 | 412.922 | -258.113 |
| 7 | 6.636 | 2.966 | 1.00000 | 154.811 | 88.148 | 66.662 |
| 10 | 15.225 | 1.800 | 1.92286 | 187.589 | 129.931 | 57.658 |
| 9 | 20.914 | 0.750 | 1.00000 | 194.566 | 123.057 | 71.509 |
| *12 | 9.207 | 2.600 | 1.58313 | 214.831 | 162.234 | 52.597 |
| 19 | -17.497 | 0.600 | 1.84666 | 261.724 | 404.121 | -142.396 |
| 15 | 8.428 | 0.820 | 1.00000 | 284.849 | 196.603 | 88.246 |
| 11 | 219.179 | 3.218 | 1.00000 | 403.293 | 137.807 | 265.486 |
| 14 | 15.102 | 0.600 | 1.84666 | 621.386 | 193.390 | 427.996 |
| 16 | 70.013 | 1.400 | 1.48749 | 1100.984 | 205.005 | 895.979 |
| 18 | 17.497 | 2.600 | 1.69680 | 1434.940 | 368.511 | 1066.429 |

TABLE 3

Aspherical Surface
Twelfth Surface

| | |
|---|---|
| R | 9.2066E+00 |
| K | -9.7258E-02 |
| A | 0.0000E+00 |
| A' | -4.1738E-05 |
| B | -3.7730E-05 |
| B' | -4.5949E-05 |
| C | 1.0435E-05 |
| C' | -1.1157E-06 |
| D | 3.6092E-08 |
| D' | 0.0000E+00 |
| E | -3.2060E-10 |

Note the twelfth surface at the wide angle end. The twelfth surface is an aspherical surface. The actual paraxial radius of curvature R is 9.207 but the apparent radius of curvature is 0.662. When the zoom lens is viewed from the first surface, the apparent radius of curvature is extremely small. In the conventional method, because the apparent radius of curvature is extremely small, the spherical center reflection light beam on the twelfth surface is not returned to the observation system with only a slight eccentricity. However, according to this embodiment, the movable stage S is moved such that the measurement reference axis C coincides with the spherical center position of the twelfth surface. Thus, it is possible to return the spherical center reflection light beam to the observation system, so that the movement quantities $\Delta Y$ and $\Delta Z$ of the movable stage S can be detected.

As describe above, according to the eccentricity measuring apparatus and the eccentricity measuring method in this embodiment, a surface which is unmeasurable in the conventional measurement can be measured.

Note the apparent spherical center position and the apparent apex position at the wide angle end in Table 1. The apparent spherical center position of the twelfth surface is 17.513. The apparent spherical center position of the nineteenth surface is 17.636. The apparent apex position of the seventeenth surface is 17.513. The apparent apex position of the sixteenth surface is 17.636. As is apparent from the results, the apparent spherical center positions and the apparent apex positions of the four surfaces are close to one another. In this case, the spherical center reflection image on the twelfth surface, the spherical center reflection image on the nineteenth surface, the apparent apex reflection image on the seventeenth surface, and the apparent apex reflection image on the sixteenth surface overlap one another on the field of view of the observation system.

In order to determine which reflection image corresponds to which surface, the field of view of the observation system is observed while the movable stage S is moved to shift the optical axis of the test lens. The reflection image position of the spherical center reflection image is changed with the movement of the movable stage S. The reflection image position of the apex reflection image is not changed with the movement of the movable stage S. According to such a determination method, it is possible to specify the spherical center reflection image on the twelfth surface, the spherical center reflection image on the nineteenth surface, which are to be measured.

However, it is difficult to determine which is the reflection image on the twelfth surface. Therefore, the determination is performed using the apparent radius of curvature as a key. The apparent radius of curvature of the twelfth surface is +0.662 and the apparent radius of curvature of the nineteenth surface is −1.438, each of which is a small value. However, an absolute value of the apparent radius of curvature of the twelfth surface is smaller than that of the nineteenth surface. As a result, the actual reflection images are observed on the field of view of the observation system, image sizes of the reflection images are different from each other. With respect to the spherical center reflection image reflected on a surface having a small apparent radius of curvature, because the apparent radius of curvature is small, a light beam related to the peripheral region of the index chart is not returned to the eyepiece system. A light beam related to only the central region of the index chart is returned to the eyepiece system. Thus, it can be determined that a reflection image having a smaller image circle, of the two reflection images which can be observed on the field of view of the observation system, is the spherical center reflection image on the twelfth surface.

Next, note the ninth surface and the thirteenth surface at the wide angle end. The apparent spherical center position of the ninth surface is 14.400 and the apparent spherical center position of the thirteenth surface is 14.496. The spherical center reflection images are formed at substantially the same position. Even in this case, according to the comparison with respect to the apparent radius of curvature, the apparent radius of curvature of the ninth surface is 4.356 and the apparent radius of curvature of the thirteenth surface is −2.6332. An absolute value of the apparent radius of curvature of the thirteenth surface is smaller than that of the ninth surface. Thus, it can be determined that a reflection image having a smaller image circle, of the reflection images which can be observed through the observation system, is the spherical center reflection image on the thirteenth surface.

At the telephoto end, the apparent spherical center position of the seventh surface is 154.811 and the apparent spherical center position of the twentieth surface is 154.808. Even in this case, according to the comparison with respect to the apparent radius of curvature, the apparent radius of curvature of the seventh surface is +66.662 and the apparent radius of curvature of the twentieth surface is −258.113. Thus, it can be determined that a reflection image having a smaller image circle, of the reflection images which can be observed through the observation system, is the spherical center reflection image on the seventh surface.

As describe above, according to the eccentricity measuring apparatus and the eccentricity measuring method in this embodiment, a desirable reflection image can be specified from a plurality of reflection images simultaneously formed on the field of view for observation. Therefore, a surface which is unmeasurable in the conventional measurement can be measured.

When a surface to be tested whose apparent radius of curvature is small is measured, it is preferable that the focal distance of the collimator objective lens K is short. When the focal distance of the collimator objective lens K is short, it is possible to project the image of the index chart T with a reduced size. Therefore, even when the surface to be tested has a small apparent radius of curvature, a reflection image having a large image circle can be returned to the observation system. When the focal distance of the collimator objective lens K lengthens, the projection image of the index chart T becomes larger.

In the case of the surface to be tested whose apparent radius of curvature is small, only an extremely central part of the spherical center reflection image is returned to the observation optical system. Thus, only a reflection image having a small image circle can be observed, so that it is hard to recognize the chart image. In contrast to this, in the case of a surface to be tested whose apparent radius of curvature has a large absolute value, it is necessary to lengthen the focal distance of the collimator objective lens K. Even when the apparent spherical center position is large, it is necessary to lengthen the focal distance of the collimator objective lens K. Therefore, the collimator objective lens K is constructed to be exchangeable. The collimator objective lens K may be composed of a lens whose focal distance is variable as in a zoom lens.

In the observation system, the reflection image formed on the imaging surface chart I is observed through the eyepiece E. Instead of visual observation, the field of view of the observation system may be detected by capturing an electronic image using a television camera or the like. Alternatively, although not shown, instead of using the eyepiece E, a light receiving element such as a CCD may be set to the surface of the imaging surface chart I. An electronic image is directly captured by the light receiving element and a reflection image is aligned with a reference origin while a displacement quantity of the reflection image is detected by image processing.

Figure 4A:
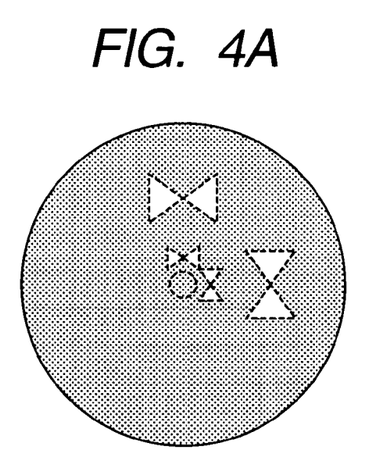
FIGS. 4A, 4B, and 4C are explanatory views showing an index chart and an imaging surface chart according to a first embodiment of the present invention.
Figure 4B:
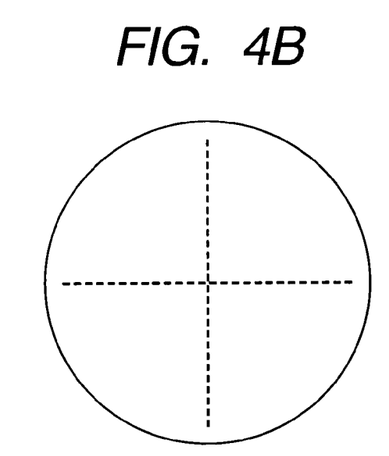
Figure 4C:
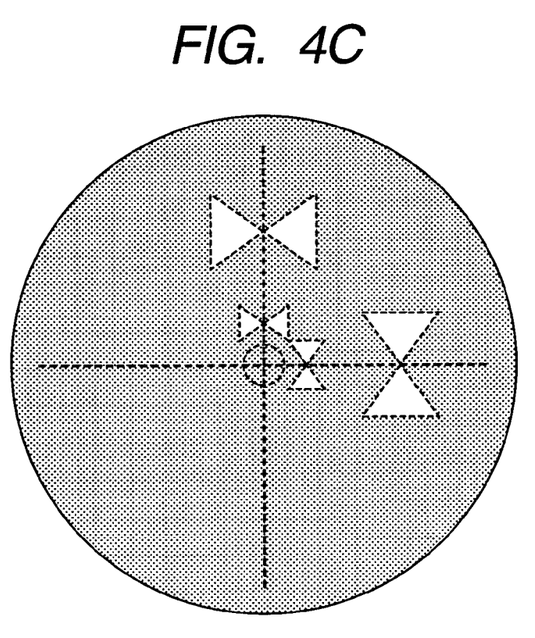

Next, the index chart T and the imaging surface chart I which are used in this embodiment will be described. FIG. 4A shows the index chart T used in this embodiment. FIG. 4B shows the imaging surface chart I used in this embodiment. FIG. 4C shows a relationship between the reflection image of the index chart T and the imaging surface chart I. In this embodiment, the measurement precision is improved by devising a method of easily adjusting the reflection image of the index chart T to the origin position of the imaging surface chart.

In order to easily adjust the image of the index chart in the right-and-left direction and the up-and-down direction in FIGS. 4A to 4C, a line width of crossed lines of the index chart T is minimized and crossed lines of the imaging surface chart I are indicated by a broken line. When the crossed lines of the imaging surface chart I are indicated by the broken line, an overlapping state with the image of the index chart T can be checked through clearances of the broken line. Therefore, the alignment is easily made with high precision.

As described above, when the apparent radius of curvature of the surface to be tested is small, the light beam related to the peripheral region of the index chart T is not returned to the observation system, with the result that the image circle becomes smaller. When the test lens has eccentricity, the center of the index chart is hard to detect. A mark indicating the center is desirably provided on the central region of the index chart. In this embodiment, as shown in FIG. 4A, a circular mark is provided on the central region of the index chart T.

The spherical center reflection image has large spherical aberration in many cases. Therefore, the spherical center reflection image is a blurred image in many cases. In the case of the blurred spherical center reflection image, the thin crossed lines blur and are hard to recognize. In this embodiment, in order to easily make alignment in the right-and-left direction and the up-and-down direction, alignment marks for the right-and-left direction and the up-and-down direction of the crossed lines are set as shown in FIG. 4A.

The alignment mark for the right-and-left direction on the paper preferably has a symmetric shape with respect to the longitudinal line of the crossed lines in the right-and-left direction. The alignment mark for the up-and-down direction on the paper preferably has a symmetric shape with respect to the lateral line of the crossed lines in the up-anddown direction. In this embodiment, a combination of two triangles symmetric with respect to in the right-and-left direction or the up-and-down direction is used. Even in the case where a reflection image blurs, when a reflection image having a symmetric shape can be recognized, it is possible to align such an alignment mark with the center of the blurred reflection image.

On the other hand, the spherical center reflection image related to the entire index chart on the surface to be tested in which the apparent radius of curvature and the apparent spherical center position are large is returned to the observation system, so that the image circle is large. However, the reflection image is dark and significantly blurs in many cases. A distance to the spherical center reflection position is longer than an effective diameter of the surface to be tested. Therefore, the spherical center reflection image on the surface to be tested in which the apparent radius of curvature and the apparent spherical center position are large becomes a state in which a diameter ratio is reduced, so that the spherical center reflection image becomes dark. In addition, the spherical center reflection image becomes a significantly blurred reflection image in many cases because of the influence of refraction due to a reduction in diameter ratio. As a result, it is hard to recognize the thin crossed lines of the index chart and the alignment mark located in the central region thereof. With respect to measures against such problems, in order to easily make alignment in the right-and-left direction and the up-and-down direction, the alignment marks larger than the alignment mark located in the central region are set in the peripheral region of the field of view of the observation system. When the large alignment marks are set, it is possible to recognize a chart position which could not be recognized up to now because of the blurred image.

As shown in FIG. 4A, the alignment marks are preferably set to only one of the right and left sides and only one of the up and down sides with respect to the center of the crossed lines. This reason is as follows. If the alignment marks are symmetrically set to both the right and left sides and both the up and down sides, when the apparent spherical center reflection image and the apparent apex reflection image overlap each other, the reflection images of the alignment marks overlap each other, so that those images are hard to recognize.

Second Embodiment

Figure 5:
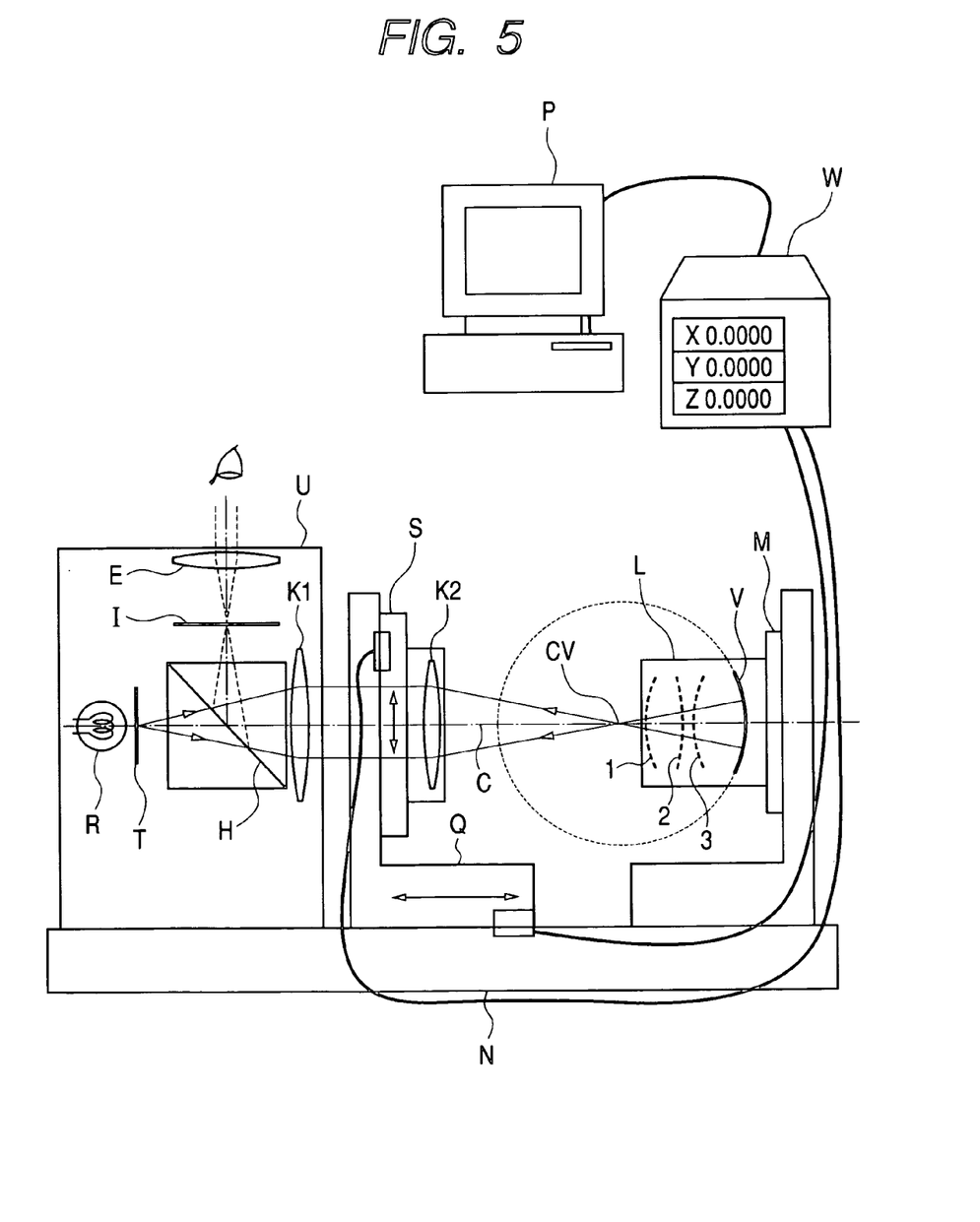
FIG. 5 is a schematic view showing an eccentricity measuring apparatus according to a second embodiment according to a first embodiment of the present invention.

Next, an eccentricity measuring apparatus according to the second embodiment will be described with reference to FIG. 5.

In the second embodiment, instead of using the collimator objective lens K according to the first embodiment, a structure including a collimator lens K1 for forming a parallel light beam and an objective auxiliary lens K2 for imaging the parallel light beam is used. The objective auxiliary lens K2 is constructed to be exchangeable for another objective auxiliary lens or composed of a lens whose focal distance is variable. Therefore, the focal distance of the objective auxiliary lens K2 can be varied. The objective auxiliary lens K2 has a structure capable of being adjusted in the direction perpendicular to the optical axis C such that the projection image of the index chart coincides with the measurement reference axis C when the objective auxiliary lens K2 is exchanged for another objective auxiliary lens. With respect to the index chart T and the imaging surface chart I, the same charts as those described in the first embodiment with reference to FIGS. 4A to 4C are used here.

The objective auxiliary lens K2 is held to the movable stage S which is movable in the direction perpendicular to the measurement reference axis C. The movable stage S is provided to the movable stage Q which is movable in the measurement reference axis C direction. The movable stage Q is provided on the rail N extended to the measurement reference axis C direction.

The test lens holding mount M has the tilt adjustment mechanism capable of adjusting the mount surface so as to become perpendicular to the measurement reference axis C. The lens holding mount M further has an adjustment mechanism which is movable in the direction perpendicular to the measurement reference axis C such that the measurement reference axis C coincides with the center of the lens holding mount M.

The test lens L is held to the lens holding mount M with a state in which the lens holding mount M is adjusted such that the mount surface is perpendicular to the measurement reference axis C and the measurement reference axis C coincides with the center of the lens holding mount M.

In the eccentric measurement, the movable stage Q is subsequently moved so as to project the image of the index chart T to the apparent spherical center position of each of the surfaces to be tested, which are calculated in advance from design data. The movable stage S is moved such that the spherical center reflection image of each of the surfaces to be tested coincides with the reference origin of the field of view of the observation system. The movement quantities ΔY and ΔZ of the movable stage S are detected by the movement quantity detecting apparatus W. The detected movement quantities are sent to the eccentricity calculating apparatus P and the actual eccentric quantity is calculated thereby.

In the second embodiment, the test lens L is completely fixed during the measurement and not moved for the measurement. Thus, the second embodiment is suitable to measure a heavy test lens. When a test lens includes a movable portion as in a zoom lens or the like, an eccentric state is prevented from being changed by a vibration or the like due to the movement of the test lens during the measurement.

This application claims priority from Japanese Patent Application No. 2003-399880 filed Nov. 28, 2003, which is hereby incorporated by reference herein.

What is claimed is:

1. An eccentricity measuring method, comprising:
   a first moving step of moving a surface to be tested relative to an optical system along a measurement reference axis;
   projecting an index to an apparent spherical center position of at least the surface to be tested through the optical system;
   a second moving step of moving the surface to be tested relative to the optical system in a direction perpendicular to the measurement reference axis based on a position of a reflection image which is obtained by reflecting an image of the index by the surface to be tested;
   using a sensor to detect a value of a relative movement quantity between the surface to be tested and the optical system in the direction perpendicular to the measurement reference axis; and
   calculating an eccentric quantity of the surface to be tested as a function of the value of the relative movement quantity between the surface to be tested and the optical system in the direction perpendicular to the measurement reference axis.

2. An eccentricity measuring method according to claim 1, wherein the first moving step, the projecting step, the second moving step, and the calculating step are executed on each of a plurality of surfaces to be tested to calculate an eccentric quantity of each of the surfaces to be tested.

3. An eccentricity measuring method according to claim 1, wherein a focal distance of the optical system is changed based on an apparent radius of curvature of the surface to be tested when the index is projected to the apparent spherical center position of the surface to be tested through the optical system.

4. An eccentricity measuring method according to claim 1, wherein a focal distance of the optical system is changed based on an apparent radius of curvature of the surface to be tested when the index is projected to the apparent spherical center position of the surface to be tested through the optical system.

5. An eccentricity measuring method according to claim 2, wherein it is determined, based on an apparent radius of curvature of each of the surfaces to be tested, which reflection image, among a plurality of reflection images of the surfaces to be tested, corresponds to a reflection image of the surface to be tested.

* * * * *

UNITED STATES PATENT AND TRADEMARK OFFICE
CERTIFICATE OF CORRECTION

PATENT NO. : 7,307,708 B2
APPLICATION NO. : 10/983605
DATED : December 11, 2007
INVENTOR(S) : Yasunori Murata Page 1 of 1

It is certified that error appears in the above-identified patent and that said Letters Patent is hereby corrected as shown below:

ON THE TITLE PAGE, at item (57), ABSTRACT:
Line 5, "an movement" should read --a movement--.

COLUMN 2:
Line 33, "from an" should read --from a--.
Line 64, "according to a first embodiment" should be deleted.

COLUMN 4:
Line 26, "an quantity" should read --a quantity--.

COLUMN 8:
Line 47, "test" should read --tested--.

COLUMN 12:
Line 31, "describe" should read --described--.

COLUMN 13:
Line 45, "describe" should read --described--.

Signed and Sealed this

Fifteenth Day of July, 2008

JON W. DUDAS
*Director of the United States Patent and Trademark Office*